INVENTOR:
ROBERT J. WILLIS JR.,
BY  W. C. Crutchen
HIS ATTORNEY.

United States Patent Office 3,094,967
Patented June 25, 1963

3,094,967
STEERABLE TORQUE-BALANCED MARINE PROPULSION DRIVE
Robert J. Willis, Jr., Nahant, Mass., assignor to General Electric Company, a corporation of New York
Filed Dec. 12, 1961, Ser. No. 158,817
5 Claims. (Cl. 115—35)

This invention relates to a marine propulsion drive of the type where a propeller pod disposed beneath the vessel is arranged to turn on a vertical axis so that it can be used to steer the vessel as well as to furnish propulsive power. More particularly, the invention relates to an improved steerable propeller pod wherein the torque reactions associated with the propulsion gearing are balanced so as not to affect the steering movements of the pod.

In the case of a steerable marine drive for a propeller pod, it is usually desired to transmit power by means of vertical shafting to a horizontally-disposed propeller shaft or shafts in the pod through bevel gearing. The use of bevel gearing introduces a couple on the pod tending to twist it about a vertical axis. This couple causes difficulties if the pod is to be steered by turning it about a vertical axis, since it will require greater force to turn the pod in one direction than in the other.

Various proposals have been made for balancing the torque in such a steerable marine drive which include counter-rotating propellors, eccentrically disposed driving shafts or driven shafts, and the use of a planetary gear to balance the pod torque against the driving torque. While these arrangements may have application in some cases, they have generally involved special techniques and fairly complicated gearing arrangements.

Accordingly, one object of the present invention is to provide a simplified steerable marine drive wherein the reactive torques on a propeller pod are balanced in order not to interfere with steering of the pod.

Another object of the invention is to provide an improved arrangement for driving a propeller pod through counter-rotating vertical shafting which permits steering the pod by rotating about a vertical axis without creating interfering reactive torques.

Still another object of the invention is to provide an improved means for utilizing differential gearing to furnish power to a steerable propeller pod by means of counter-rotating vertical shafts.

Other objects and advantages will be apparent from the following description taken in connection with the accompanying drawing in which.

Generally stated, the invention is practiced by driving the cage of a differential gear arrangement so as to drive two coaxial shafts at the same speed. The direction of one of the coaxial shafts from the differential gear is reversed by means of an idler. Torque is balanced by means of counter-rotating shafts supplying the propeller pod gearing. The pod is steerable about a vertical axis and the differential gearing allows for the resulting difference in speeds of the counter-rotating shafts when the pod is turned.

Figure 1:
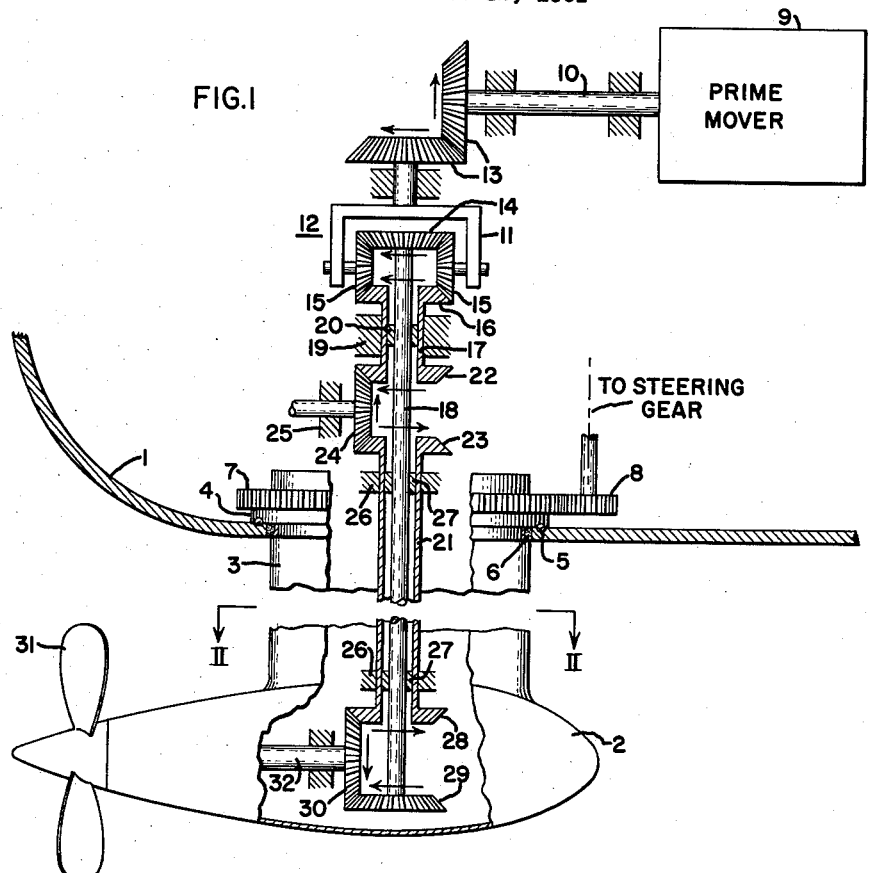
FIG. 1 is a diagrammatic elevation view, partly in section, of the torque-balanced steerable drive.

Referring to FIG. 1 of the drawing, a vessel hull seen at 1 supports a pod 2 by means of a vertical strut 3. The strut 3 is of "teardrop" cross section (see FIG. 2) to reduce the resistance to the water, and is attached at its upper end to a circular bearing ring 4 resting on bearings 5 so that it can rotate about a vertical axis with respect to the hull 1. A suitable watertight packing 6 prevents leakage between the bearing ring and the hull. Attached to the bearing ring 4 is a large gear rim 7 which is rotated by means of a meshing pinion gear 8 actuated by the steering mechanism (not shown). The precise arrangement for steering the propeller pod 2 is not material to the present invention and various other means might be employed to turn the pod 2 about a vertical axis with respect to hull 1 so as to steer the vessel.

Power is supplied from a prime mover 9, such as a steam turbine or gas turbine, through a horizontal drive shaft 10. Shaft 10 turns the cage structure 11 of a bevel differential gear arrangement, shown generally as 12, through a set of bevel gears 13. The differential gear arrangement 12 includes a first output gear 14, a second coaxial output gear 16, and several connecting planet gears 15 which are freely rotatable to cage 11. In the arrangement shown, output gear 14 and output gear 16 are of equal diameters, so that coaxial shafts 18, 17 respectively are rotated in the same direction at equal speeds. Shaft 17 is journaled in fixed bearings 19, while an additional supporting bearing 20 is disposed between shafts 17, 18 to provide for relative rotation between the shafts.

Also disposed coaxially about inner shaft 18 is another hollow shaft 21. Hollow shafts 17, 21 are coupled through upper and lower bevel gears 22, 23 and a reversing idler bevel gear 24 mounted in a bearing 25. Bevel gears 22, 23 are also of equal diameters so that shaft 17 and shaft 21 will rotate at the same speed but in opposite directions. The bearing 25 is shown as fixed or relatively stationary with respect to the hull structure. This represents the ideal case which results in the minimum speed of rotation of differential gears 15 (relative to cage 11) during steering. However, the reversing bevel unit could be located in the steerable strut structure. In this case, bearing 25 would be fixed to the strut and would turn with it. This would increase the rotational speed of the differential gears 15 during steering, but would cause the overall mechanism to function in much the same manner.

Counter-rotating shafts 18, 21 are supported in bearings 26, 27 within strut 3, and are connected at their lower ends to counter-rotating bevel gears 29, 28 respectively. Gears 28, 29 serve as pinions to drive the propeller bevel gear 30 which, in turn, rotates propeller 31 by means of a shaft 32.

Figure 3:
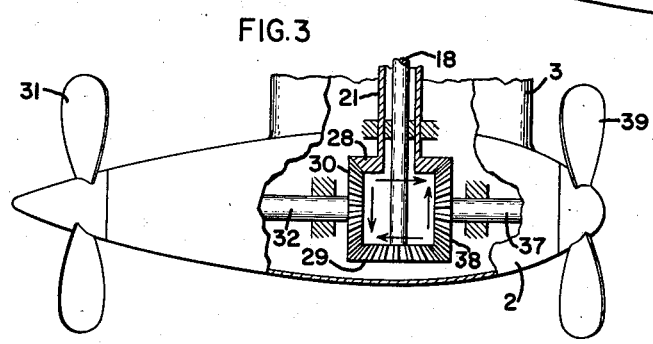
FIG. 3 is a diagrammatic view, partly in section, of a modified arrangement of the pod gearing.

A modified arrangement of the bevel gearing within the propeller pod 2 is illustrated in FIG. 3. The gearing arrangement in the vessel and in the upper portion of the strut is not shown, since it is similar to FIG. 1. However, in the pod 2 itself, an additional propeller output shaft 37 is driven by a bevel gear 38 meshing with gears 28, 29 so as to drive a propeller 39 on the front of the pod. Since the propeller shafts 32, 37 rotate in opposite directions, the pitches of the propellers 31, 39 must be in opposite directions so as to provide combined thrust from both propellers.

Figure 2:
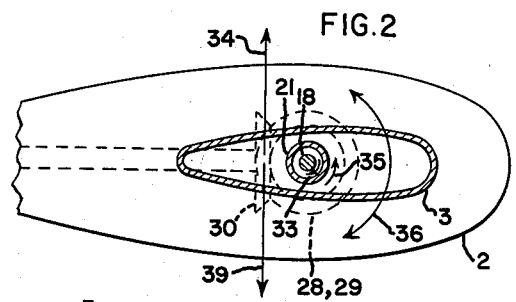
FIG. 2 is a sectional plan view taken through the strut supporting the pod along lines II—II of FIG. 1.

FIG. 2 illustrates the various forces and torques imposed on the strut 3 and the propeller pod 2 about the vertical shaft axis in the gear arrangement of FIG. 1. The inner shaft 18 turning in the direction indicated by arrow 33 causes the lower bevel gear 29 through its reaction with the bevel gear 30 to produce an unbalanced transverse force on pod 2 as indicated by arrow 34. This causes a couple tending to turn pod 2 clockwise about its vertical axis.

Similarly, the hollow shaft 21 rotating in the direction indicated by arrow 35 causes the upper bevel gear 28, also meshing with gear 30, to impose a transverse force on the pod in the opposite direction as indicated by arrow 39. Force 39 gives rise to a couple tending to turn pod 2 about its vertical axis in a counterclockwise direction. The couples produced by the steering mechanism 7, 8 may be in either direction about the pod vertical centerline and are signified by arrows 36.

The operation of the improved steerable drive will now be described. It will be apparent that the drive shaft 10 will rotate the cage 11 so as to turn bevel gears 14, 16 in the same direction at the same speed. The planet gears 15 do not turn within their bearings unless the pod is being turned to accomplish steering. The idler gear 24 serves to reverse the direction of rotation of the outer shaft so that shafts 18, 21, supplying an input to gears 28, 29 in the propeller pod 2, are counter-rotating.

As seen in FIG. 2, counter-rotating gears 28, 29 give rise to opposite transverse forces signified by arrows 34, 35 on the pod. Since the gears 28, 29 are of the same diameter, and since the shafts 18, 21 are rotating in opposite directions at the same speed, the couples produced by forces 34, 35 are equal and in opposite directions so that the torques on pod 2 and strut 3 about the vertical axis are balanced. Therefore, the reactions of the bevel gearing in the pod do not tend to interfere with the steering motions of the pod in either direction.

Steering motions are produced by the steering pinion gear 8 to turn the pod in either direction as indicated by arrows 36. As the pod turns, it will be appreciated that one of the counter-rotating shafts 18, 21 undergoes a slowing-down of absolute angular velocity, while the other shaft undergoes an increase in absolute angular velocity. This difference in rotational velocity is communicated upward to the differential gear arrangement 12 and is accommodated by the planet gears 15 rotating slightly with respect to the driving cage 11. Since the reactive torques on pod 2 due to the bevel gearing therein are at all times balanced during this rotation of the pod about its vertical axis, there is no resistance to steering movements in either direction, and the pod can turn freely with respect to the ship's hull, excluding, of course, any external hydrodynamic forces.

The arrangement in the pod itself can take various configurations as indicated by FIGS. 1 and 3. A single aft propeller can be used, driven from the two bevel gears 28, 29 as in FIG. 1, or counter-rotating propellers as in FIG. 3, or the aft propeller of FIG. 3 can be omitted and a single forward propeller used.

Although 1:1 driving ratios have been shown illustrated both in the differential gear arrangement and in the reversing idler arrangement, it will be apparent to those skilled in the art that other ratios might be used in the differential gear set and the reversing idler set to obtain an overall combined ratio of 1:1, so that counter-rotation of the lower shafts 18, 21 at equal speeds and torques is provided. Also, although the differential unit 12 and the idler set are shown as comprising bevel gearing, spur gearing might be substituted, as will be apparent to those skilled in the art.

Thus, it is seen that the invention provides a steerable marine propulsion drive in which the couples about the vertical axis due to the gears in the pod are exactly balanced. Therefore, the steering gear may turn the pod to steer the vessel without any effect from or on the propulsion gearing, while the differential gearing allows for a transient difference in speeds of the counter-rotating shafts as the pod is turned.

While there has been described herein the preferred embodiment of the invention, and one modification, it is intended to cover in the appended claims all such modifications as fall within the true spirit and scope of the invention.

What I claim as new and desire to secure by Letters Patent of the United States is:

1. A torque-balanced steerable marine propulsion drive comprising:
   a vessel structure including a prime mover disposed therein,
   a propeller pod supported below said vessel structure and rotatably mounted for oscillation about a vertical axis,
   steering means for oscillating said propeller pod relative to the vessel structure,
   differential gearing means including first and second gears and a cage driven by said prime mover, said cage having freely rotatable planet gears driving said first and second gears in the same direction while providing differential movement therebetween,
   reversing gear means coupled to said second gear and including a third gear driven in the reverse direction from said first and second gears at the same absolute speed as the first gear,
   first and second rotatably journaled coaxial shaft means driven by the first and third gears and extending into the propeller pod,
   vertically spaced fourth and fifth bevel gears disposed in said pod and connected to said first and second shaft means respectively,
   and a sixth bevel gear driven by said fourth and fifth bevel gears together, whereby couples about the pod vertical axis caused by reactions between the fourth and fifth bevel gears with the sixth bevel gear are balanced by the counter-rotation of said gears while said differential gearing means permits different speeds of said first and second shaft means as the pod is oscillated for steering.

2. A torque-balanced steerable marine propulsion drive comprising:
   a vessel structure including a prime mover disposed therein,
   a propeller pod disposed below said vessel structure and journaled for oscillation therein about a vertical axis,
   steering means for turning said propeller pod relative to the vessel structure,
   differential gearing means including first and second coaxial vertically spaced bevel gears and a cage driven by said prime mover about an axis coaxial with said first and second gears, said cage having freely rotatable bevel planet gears driving said first and second gears in the same direction while providing differential movement therebetween,
   reversing gear means coupled to said second gear and including a third gear coaxial with said first and second gears and driven in the reverse direction from said first and second gears at the same speed as the first gear,
   first and second coaxial shaft means driven by the first and third gears and extending into the propeller pod,
   vertically spaced fourth and fifth bevel gears of equal diameter disposed in the pod coaxial with said first, second and third gears and connected to said first and second shaft means respectively,
   and a sixth bevel gear driven by said fourth and fifth bevel gears simultaneously, whereby couples about the pod vertical axis caused by the interactions of the fourth and fifth gears with the sixth gear are substantially balanced, while the differential gearing means provides for transient differential speeds of said counter-rotating shafts as the pod is oscillated for steering.

3. A torque-balanced steerable marine propulsion drive comprising:
   a vessel structure including a prime mover disposed therein,
   a propeller pod disposed below said vessel structure and rotatably mounted therein about a vertical axis,
   steering means for rotating said propeller pod in the vessel structure,
   differential gearing means including first and second coaxial vertically-spaced bevel gears and a cage driven by said prime mover about the same axis as that of said first and second gears, said cage having freely rotatable bevel planet gears driving said first and second bevel gears in the same direction while providing differential movement therebetween, reversing gear means including third and fourth bevel gears coaxial with said first and second bevel gears and coupled by a bevel reversing idler gear, said second and third bevel gears being coupled to turn together, first and second coaxial shafts driven in opposite directions at the same speed by the first and fourth bevel gears respectively, and extending into the propeller pod, fifth and sixth bevel gears disposed in said pod coaxial with said third and fourth gears and connected to said first and second shaft means respectively, and a seventh bevel gear driven simultaneously by said fifth and sixth bevel gears, whereby couples about the pod vertical axis due to reactions of the fifth and sixth bevel gears with the seventh bevel gear are substantially balanced while said differential gearing means provide for different absolute speeds of the counter-rotating shafts as the pod is rotated.

4. The combination according to claim 3 including an eighth bevel gear driven by said fifth and sixth bevel gears simultaneously, and first and second propeller shafts connected to said seventh and eighth gears and extending from opposite ends of said pod, said propeller shafts having propellers of opposite pitch disposed thereon.

5. Power transmission gearing for a steerable marine propulsion pod comprising a bevel gear differential including axially spaced first and second coaxial bevel gears carried on a first inner and a second outer coaxial shaft respectively and a cage member carrying a plurality of differential planet gears engaging said coaxial bevel gears, a power input shaft connected to drive said cage member, said first shaft extending downwardly into the pod, a third outer coaxial shaft disposed coaxially around the lower portion of said first shaft, third and fourth axially spaced gears carried on the adjacent ends of said second shaft and said third shaft respectively, idler gear means engaging said third and fourth gears whereby the fourth is driven in the opposite direction relative to the third, power output gearing in the pod connecting the lower ends of said first and third coaxial shafts to propeller means carried by the pod, and means for oscillating the pod about the axis of said coaxial shafts for steering.

References Cited in the file of this patent

UNITED STATES PATENTS

| 1,381,939 | Small | June 21, 1921 |
| 1,482,381 | Cake | Feb. 5, 1924 |
| 2,372,247 | Billing | Mar. 27, 1945 |
| 2,386,362 | Soldner | Oct. 9, 1945 |
| 2,755,765 | Wanzer | July 24, 1956 |
| 2,987,031 | Odden | June 6, 1961 |
| 3,021,725 | Schneider | Feb. 20, 1962 |

FOREIGN PATENTS

| 1,012,843 | Germany | July 25, 1957 |
| 822,204 | Great Britain | Oct. 21, 1959 |
| 833,343 | Great Britain | Apr. 21, 1960 |